United States Patent
Wang et al.

(10) Patent No.: US 7,856,067 B2
(45) Date of Patent: Dec. 21, 2010

(54) UNEQUAL HIERARCHICAL COMMUNICATIONS MODULATION METHOD

(75) Inventors: Charles C. Wang, Arcadia, CA (US); Lan Xu, Cerritos, CA (US); Samuel Lim, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 906 days.

(21) Appl. No.: 11/732,630

(22) Filed: Apr. 4, 2007

(65) Prior Publication Data

US 2008/0247470 A1  Oct. 9, 2008

(51) Int. Cl.
  H04L 5/12 (2006.01)
  H04L 23/02 (2006.01)
(52) U.S. Cl. .................. 375/261; 375/265; 375/241
(58) Field of Classification Search .......... 375/265, 375/261, 241, 259, 240
See application file for complete search history.

(56) References Cited

U.S. PATENT DOCUMENTS 5,453,797 A * 9/1995 Nicolas et al. ............. 348/607
2003/0164975 A1 * 9/2003 Aoyagi et al. ............. 358/1.15
2006/0274862 A1 * 12/2006 Lui et al. .................. 375/341
2008/0201628 A1 * 8/2008 Liou et al. ................. 714/786
2008/0212708 A1 * 9/2008 Koslov ..................... 375/286

* cited by examiner

Primary Examiner—David C Payne
Assistant Examiner—Brian J Stevens

(57) ABSTRACT

Hierarchical modulation preferably uses a 16-ary quadrature amplitude modulation (QAM) modulator with a convolutional encoder that combine to effectively provide unequal protection to two different segments of streaming input data, with improved power efficiency with the same bandwidth efficiency, by encoding the first segment as coded data as LSBs as the second segment remains uncoded as uncoded MSBs, with the MSBs used for QAM constellation modest reliability interquadrant demodulation and detection, and with the LSBs used for low reliability intraquadrant detection, but with the LSBs subject to convolutional encoding and decoding rendering the LSBs with high reliability detection, such that, the two segments have unequal coding and modulation for providing unequal levels of reliability detection.

20 Claims, 4 Drawing Sheets

HIERARCHIAL MODULATION COMMUNICATION SYSTEM

HIERARCHIAL MODULATION COMMUNICATION SYSTEM

CODED FRAME DATA STRUCTURE

HIERARCHIAL SIGNAL CONSTELLATION

UNEQUAL HIERARCHICAL COMMUNICATIONS MODULATION METHOD

STATEMENT OF GOVERNMENT INTEREST

This invention was made with Government support under Contract No. 50-SPNA-0-00012 awarded by the Department of Commerce. The Government has certain rights in the invention.

FIELD OF THE INVENTION

The invention relates to the field of communications system modulation for communicating compressed data streams. More particularly, the invention relates to unequal hierarchical modulation of compressed data streams with header.

BACKGROUND OF THE INVENTION

In applications of satellite remote sensing and broadcasting, data compression is often necessary due to communications channel limited bandwidth. When data is compressed, the data is typically encoded with a header, such as the frame header with a sync mark. The header contains much more important information than other data segments, such as the length of the following compressed data segment. The bit error rate (BER) communications requirement of a communication system is specified based on need to accurately receive the header data whereas the nonheader data, such as trailing compressed data receives the same BER requirement. High BER requirements are wasteful when the BER requirement is strictly based on headers, as the BER requirement for the header data is too stringent for the compressed data.

As an example, a next generation of satellite systems will provide up to 140 Mbps for sensor data during downlink from satellite to a ground control center and 32 Mbps for global rebroadcasting from the ground control center back to satellite and then to smaller remote user terminals. However, the allocated bandwidths are limited for both sensor data and global rebroadcasting. The use of higher-order modulations is needed to conserve spectrum. An 8-ary phase shift keying (8PSK) modulation system sends three bits per channel symbol. A 16-ary quadrature amplitude modulation (16QAM) system sends 4 bits per channel symbol. To compensate the reduction of about 4 dB of power efficiency introduced by 8PSK and 16QAM, a forward error correction FEC code needs to be adopted. A rate ¾ convolutional code can recover this loss as taught by Charles Wang, Donald Olsen, and Roger Heymann in Widespread Satellite Communication Use and Availability Of Advanced Modulations and Forward Error Correction Coding, Proceedings of Satellite Data Compression, Communication, and Management Sub-Conference in SPIE 2005 International Symposium on Optics and Photonics, San Diego, CA, Jul. 31-Aug. 4, 2005.

The quality of the uncompressed JPEG2000 data is not acceptable after passing through a protected channel that provides a BER of $10^{-5}$ as taught by Donald Olsen et al., in the Assessment of Error Propagation in Ultraspectral Sounder Data via JPEG2000 Compression and Turbo Coding, Proceedings of Satellite Data Compression, Communication, and Management Subconference at the SPIE 2005 International Symposium on Optics and Photonics, San Diego, Calif., Jul. 31-Aug. 4, 2005. This channel protection is because the entire frame of decompressed picture data is completely corrupted when an error occurs in the header. Therefore, a stringent BER requirement for the header must be specified. For example, the required BER for headers may be set to be $10^{-6}$. An $E_C/N_O$ value of 8.8 dB is required to achieve this BER when rate ¾ convolution code and 16QAM are used. Nevertheless, the data other than header definitely does not need such a stringent BER requirement.

Prior to transmission, a compressor compresses original data into the header and the compressed data. The header and compressed data may be further encoded using a convolutional encoder for providing convoluted data. The convoluted data is modulated into symbols where the coded header and coded compressed data bits are modulated into electrical signals indicating symbols. The symbols are communicated within a coded data structure defining a coded data frame. The compressed data and header are encoded into convoluted data. The convoluted data bits are grouped into M-ary symbols that are respectively mapped to points in the constellation space. The symbols are modulated into M-ary PSK or M-ary QAM electrical signals. The procedures of grouping, mapping, and modulating are conducted at the same time and considered as part of the modulation process.

An entire frame of compressed data including header is modulated within a transmission modulation method, such as quadrature amplitude modulation (QAM) where the symbols are QAM symbols. The QAM transmission method acts upon predetermined sets of data, such as four bit sets, for providing the respective communicated symbols, such an 16-ary symbols, for defining a signal constellation space having 16 predetermined points within the constellation space, such as a 16-ary QAM signal constellation space. The transmitted symbol electrical signals are received and compared to the symbol signal constellation for demodulating the received symbols into corresponding data bits or soft metrics that are used for further decoding if a FEC code is used. As such, the input data frame bits are grouped into symbols that are electrically modulated within the constellation space that may be, for example, a 16-ary QAM signal constellation space referred herein as 16QAM constellation space.

An original input data set may be compressed into an input data frame using conventional compression methods. The resulting input data frame may include a header segment and a compressed data segment grouped in an input data frame. The header and compressed data can also be then encoded where the input data is encoded using a block or convolutional encoder for providing encoded input data. The encoded input data is then modulated within a transmission modulation method, such as QAM where the symbols are QAM symbols. The encoded data is modulated into symbols where the encoded data bits are modulated into electrical signals indicating transmitted symbols. The symbols are communicated within a data structure defining a coded data frame when the input data was encoded. The QAM transmission method acts upon predetermined bit sets of the encoded input data, such as four bit sets, for providing the respective communicated symbols, such an 16-ary QAM symbols, for defining a signal constellation space having 16 predetermined points with the constellation, such as a 16QAM signal constellation.

A set of possible symbols is effectively electrically mapped into the constellation space that is used to demodulate the received symbols into respective data sets or soft metrics. The symbol electrical signals are matched to symbol points to which the electrical signals are most closely aligned for providing received data sets or soft metrics. The transmitted symbols are transmitted as electrical signals that are received and compared to the symbol signal constellation space for demodulating the received symbols into corresponding data bits or soft metrics that may be encoded output data. The received coded data sets or soft metrics indicate coded data. The coded data sets or soft metrics are decoded into output data. The decoding can be by a block decoder or a convolutional decoder operating on the received coded data sets, or a Viterbi decoder operating upon the soft metrics for providing a likelihood determination of uncoded output data. The encoded output data can be decoded using a decoder to provide output data, which may be the header and compressed data where compression is used. The output data being compressed data can then be decompressed into the original input data.

When the symbol encoded header data, or simply the header, and symbol encoded compressed data, or simply the compressed data, in an encoded data frame, are received as communicated symbols, the received symbols are decoded by a most likely mapping to the symbol points of the constellations. The header data and the compressed data are equally encoded using a block encoder or convolutional encoder into an encoded data frame providing redundancy equally across the entire input data frame. The coded bits are grouped into symbols with respective symbol points. The symbol points in the constellation space are equally spread throughout the constellation that may be a quadrature constellation signal space having M-ary points, such as 16 points in a 16QAM symbol constellation. As such, the header and the compressed data are equally encoded into symbols that equally modulated in the constellation space having equal point spacing or spreading for equal like demodulation and decoding upon reception. When both the header and compressed data have the same data-to-symbol encoding and are mapped into the same constellation space with equally spaced points in the constellation, both the header segment and the compressed data segment of the input data frame have the same BER upon reception.

Communicated frames of header and compressed data maybe subject to convolution codes that increase the number of bits of a frame. The increased number of bits is redundancy data used for improved reception. The increased number of bits providing redundancy for the communicated bits improves the BER at the expense of transmitting more bits. Hence, there is a tradeoff in bandwidth and BER. The header and compressed data is subject to the same level of redundancy defined by a code rate which is an inverse of one plus the redundancy rate. The convolution code for providing redundancy improves data recovery, and hence, improves the overall BER. The redundancy and consequential improved BER performance is equally spread across the entire frame. The use of redundancy however consumes channel bandwidth as a trade off between BER required performance and bandwidth used. As such, both convolution redundancy and symbol modulation of equally spaced points of a constellation space provide equal BER performance across an entire encoded data frame of header and compressed data.

Prior to transmission, data can be compressed into compressed data. Compressed data can be convoluted into convoluted data. Convolution produces redundancy for improved BER at a cost of increased bandwidth requirements. The convoluted data frame bit sets are encoded into symbols. The symbols are modulated, such as 16QAM, into a constellation space having predetermined equally spaced constellation points. The modulated symbols are transmitted as electrical transmitted signals over a channel, such as a Gaussian channel. Received electrical signals are compared to the constellation space for determining the most likely data sets or soft metrics, both of which indicated coded data. A stream of symbols provides a stream of bit sets or soft metrics. The bit sets or soft metrics are decoded into the original header and compressed data. The header and compressed data can be decoded into the original data. The redundancy during decoding is used to improve the reliability of the received data bits. The difference between the original data and the decoded received data indicates the BER.

In communications, it is often necessary for the header to be more reliably received with high header reliability. The higher reliability also determines the reliability of the received compressed data portion of a frame that does not necessarily require the same high level of received reliability, that is, with the same required BER performance. Improved BER performance has the disadvantage of increased bandwidth requirements. However, the higher reliability of the compressed data in the frame is not necessary as compared to the header. As such, conventional convolutional and symbol encoding unnecessarily requires more bandwidth usage than is required for a required BER that is specified in view of the header requiring the highest reliability. Conventional communications systems do not provide convolutional and symbol encoding modulation methods that allows unequal reliability across different segments of streaming communicated data frames typically including a header requiring high reception reliability and compressed data requiring low reception reliability, for optimal bandwidth utilization for a given required BER performance. These and other disadvantages are solved or reduced using the invention.

SUMMARY OF THE INVENTION

An object of the invention is to provide a system for unequal protection of communicated data within a data frame.

Another object of the invention is to provide a system for unequal protection of communicated data within a data frame using unequal encoding and unequal modulation.

Yet another object of the invention is to provide a system for unequal protection of communicated data within a data frame using unequal encoding where one segment of the input data is encoded as coded data and another segment of the input data is uncoded as uncoded data.

Still another object of the invention is to provide a system for unequal protection of communicated data within a data frame using unequal modulation where one segment of the input data is modulated into symbols using a constellation space of points where point spacing for one segment of the input data is different than the point spacing for another segment of the input data.

A further object of the invention is to provide a system for unequal protection of communicated data within an input data frame using unequal encoding where one segment of the input data is encoded as coded data and another segment of the input data is uncoded as uncoded data, and using unequal modulation where the coded data and uncoded data are concurrently modulated into symbols using a constellation space of points where constellation point spacing for coded data is unequal to the point spacing for the uncoded data.

Yet a further object of the invention is to provide a system for unequal protection of communicated data within an input data frame using unequal encoding where a header of the input data is encoded as coded data and compressed data of the input data of the input data is uncoded as uncoded data, and using unequal modulation where the coded data and uncoded data are concurrently modulated into symbols using a constellation space of points where constellation point spacing for coded data is unequal to the point spacing for the uncoded data.

Still a further object of the invention is to provide a system for unequal protection of communicated data within an input data frame using unequal encoding where a header and a second portion of compressed data of the input data frame is encoded as coded data and a first portion of the compressed data of the input data frame is uncoded as uncoded data, and using unequal hierarchical modulation where the coded data and uncoded data are concurrently modulated into symbols using a constellation space of points where constellation point spacing for coded data is unequal to the point spacing for the uncoded data.

The present invention is directed to a communications system having a hierarchical modulation method for providing unequal reception reliability to different segments of an input data frame. The unequal protection is accomplished using unequal encoding and unequal modulation. In the preferred form, a first segment of the input data frame remains uncoded but a convolutional encoder is used to encode a second segment of an input data frame for respectively providing uncoded and coded data. The coded and uncoded data are combined as an unequal coded input of grouped bits, grouped into nibbles, and fed into a hierarchical modulator that unequally modulates the coded data and uncoded data, that is the nibbles, into transmitted symbols within a constellation space having unequal point spacing. In the preferred form, the hierarchical modulator is a 16-ary quadrature amplitude modulation (16QAM) modulator having a 16-ary constellation space of sixteen points unequally spaced to transmit a stream of symbols corresponding to the input data frame of coded data and uncoded data.

In the preferred form, the original input data frame, that may be a compressed data frame of a header and compressed data, is translated into three data bits of input data d1, d2, and d3. Two data bits d1 and d2 remain uncoded as the most significant bits (MSB) b1 and b2 to the modulator. The third data bit d3 is the least significant bit (LSB) that is coded using a rate ½ forward error correcting code for generating two convoluted bits e3 and e4 for each input data bit d3. The convoluted bits e3 and e4 are grouped into the nibbles at nibble bits b3 and b4. The data bits d1 and d2 of uncoded data and convoluted bits e3 and e4 are grouped into the nibbles of four bits b1, b2, b3 and b4 as symbols as inputs the modulator. The coding of the third data bit d3 is performed because of desired higher required protection for input data on data bit d3. The data bit d3 is placed at the LSB position. The convoluted bits e3 and e4 are coded bits as the LSBS. As such, the header is coded whereas compressed data on data bits d1 and d2 are not coded, for unequal coding. The nibbles b1b2b3b4 corresponding to symbols are modulated by the modulator into transmitted symbols as quadrature electrical signals.

In the preferred form, the modulator provides unequal spacing of symbol points in the constellation space by large interquadrant spacing and small intraquadrant spacing. The constellation space has large interquadrant point spacing for improved demodulation performance of the MSB data bits d1 and d2 of uncoded data, that is, the nibble bits b1 and b2, defining the constellation quadrants, but has small intraquadrant spacing for points defining the coded nibble bits b3 and b4 for modest degraded modulation and demodulation performance associated with the LSB d3. Hence, the hierarchical modulator has unequal modulation of nibble bits where the MSBs b1 and b2 have increased modulator discrimination, and where, the LSBs b3 and b4 have decreased modulator discrimination. However, because d3 was encoded into convoluted bits e3 and e4 and used as intraquadrant bits b3 an b4, a decoder, upon reception, decodes the b3 and b4 data sets or soft metrics into the data bit d3, with significantly increased protection of the data bit d3, and hence, significantly increased protection for the header.

Depending on the unequal performance requirements, between the LSB d3, such as for a header of coded data, and the MSBs d1 and d2, such as for compressed data of uncoded data, the constellation space can be optimized so that a minimum amount of transmitted power is needed. The peak-to-average power ratio of a 16QAM constellation requires a power back-off when passing through a nonlinear power amplifier, such as a traveling wave tube or solid-state power amplifier. The power back-off is needed in order to avoid signal distortion. The BER performances of the hierarchical modulation is improved over 8PSK and rate ¾ coded 16QAM, which have the same spectrum efficiency taking into account the required power back-off. The hierarchical modulation can result in a potential in power savings to any remote sensing or broadcasting satellite system. These and other advantages will become more apparent from the following detailed description of the preferred embodiment.

DETAILED DESCRIPTION OF THE PREFERRED EMBODIMENT

Figure 1:
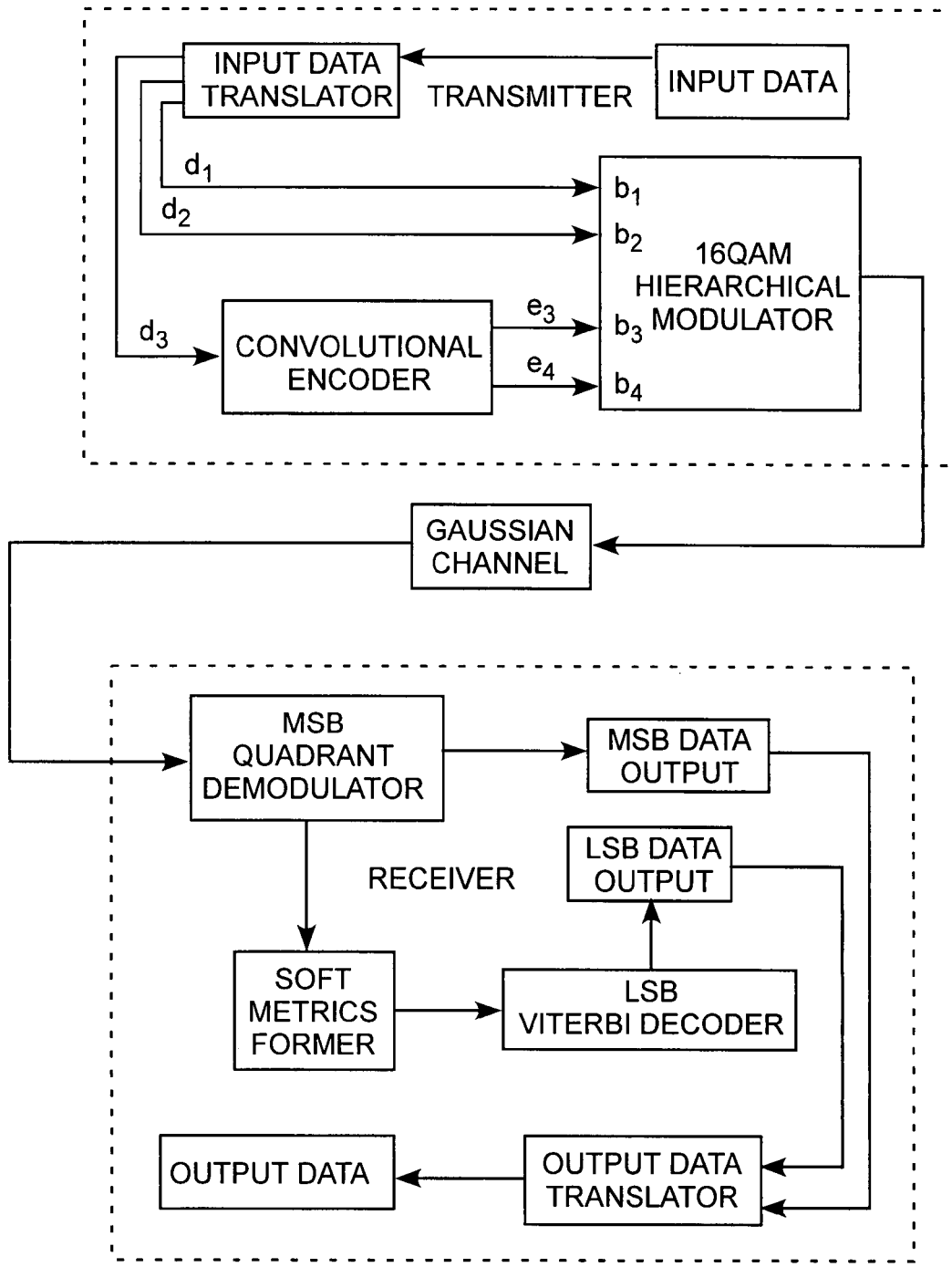
FIG. 1 is a block diagram of a hierarchical modulation communication system.
Figure 2:
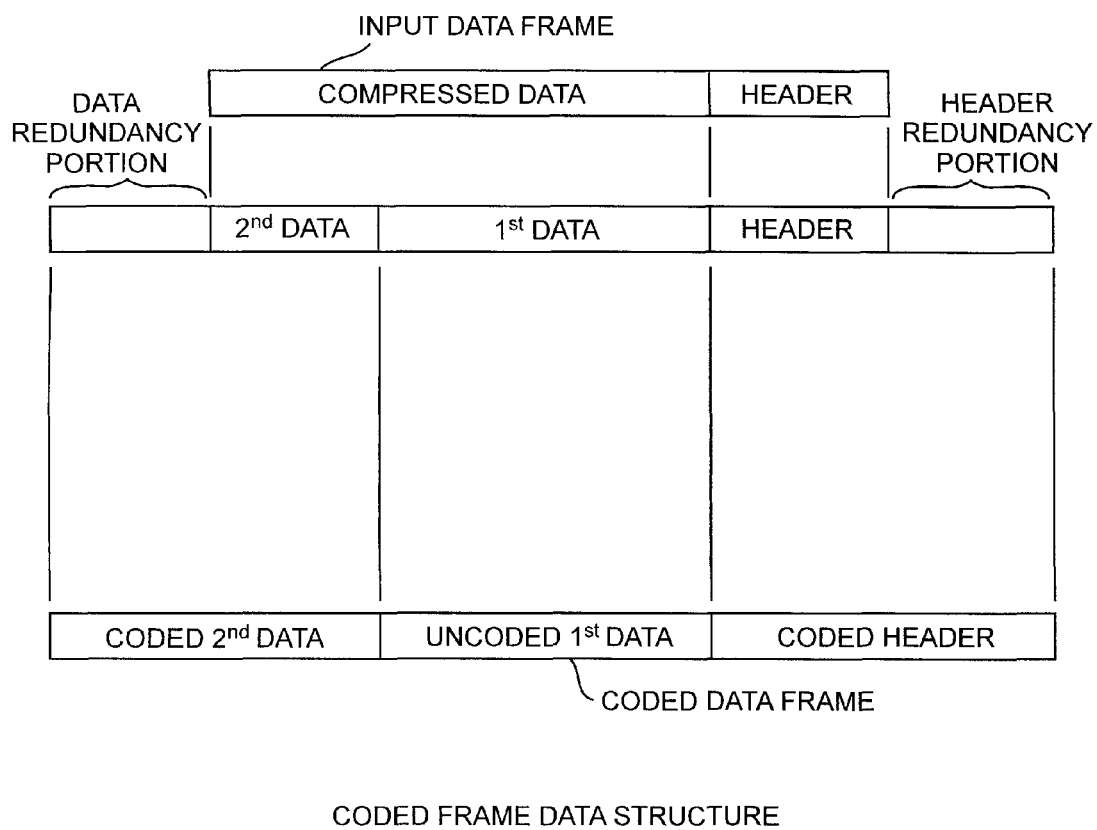
FIG. 2 depicts a coded frame data structure.

An embodiment of the invention is described with reference to the figures using reference designations as shown in the figures. Referring to FIGS. 1 and 2, a transmitter and a receiver are used to communicate symbols of coded data frames over a Gaussian channel. The transmitter received input data that is structured into two segments. For example, the input data maybe compressed by an input compressor, not shown, for providing the input data in two segments including a header and compressed data. The input data is minimally structured in an input data frame having the two segments. However, for consistent numerology, the compressed data can be further segmented. For example, the input data can include the header, a first portion of the compressed data, or simply first data, and a second portion of the compressed data, or simply second data. The input data is translated by an input data translator receiving the header and compressed data. The first data is communicated alternately on data bits d1 and d2 by the input data translator. The header and the second data that are communicated in sequence on data bit d3 by the input data translator. As such, the input data being a stream of data bits consisting in order of a header and compressed data is translated by the translator into data bits d1 and d2 for providing the first data and into data bits d3 for providing the header and the second data.

The header and second data on data bit d3 is convoluted by a convolutional encoder. The first two data bits d1 and d2 of the first data of the input data frame are fed directly into an exemplar 16-ary quadrature amplitude modulation (16QAM) hierarchical modulator as nibble bits b1 and b2 without being convoluted. That is, first data on nibble bits b1 and b2 are not coded. The third data bit d3 of the header and second data of the input data is fed into the convolutional encoder providing convoluted bits e3 and e4 that are then fed into the 16QAM hierarchical modulator as nibble bits b3 and b4. The header is encoded into the coded header comprising header information content indicating the header and header redundancy.

The second data is also encoded into the coded second data comprising second data information content indicating the second data and the second data redundancy.

The convolution encoder may be a rate ½ forward error correcting code applied to third data bit d3. The first data on data bits d1 and d2 and convoluted bits e3 and e4 are fed into the 16QAM hierarchical modulator as nibble bits b1, b2, b3, and b4 collectively as a series of four bit nibbles. Nibble bits b1 and b2 are the most significant bits (MSBs). Nibble bits b3 and b4 are the least significant bits (LSBs). The MSBs and LSBs of the four bit nibbles are fed to the 16QAM hierarchical modulator in a stream of nibbles for providing a respective stream of input symbols. In the 16QAM hierarchical modulator, the first data is used as MSBs and the second data, the second data redundancy, the header, and the header redundancy are coded as the LSBs. The nibbles b1, b2, b3, and b4 are modulated by 16QAM hierarchical modulator into respective symbols prior to transmission as electrical signals. The 16QAM hierarchical modulator modulates the nibbles b1, b2, b3, and b4 into symbols and transmits the symbols over the Gaussian channel to the receiver in coded data frames.

The input data is normally a stream of data. The input data translator provides, in practice, a translation function. The translation receives a stream of data bits of the input data in an input data frame format and translates the input data frame so that all of the first data is presented on input bits d1 and d2, while concurrently and synchronously, the header and second data appear in sequence on input bit d3. As such, the input data translator would have storage and a processor for presenting the input data frame accordingly on input bits d1, d2, and d3. As such, the number of bits of the first data presented on bits d1 and d2 is twice the number of bits of the header and appended second data presented on d3, so that, the number of bits of data input d1, d2, and d3 equal each other for each input data frame of input data. In the case of a ½ convolutional encoder, the two convoluted bits e3 and e4 are generated from each of the data bits d3. As the header and second data bits are passed through the convolutional encoder, twice as many convoluted bits are generated. Hence, the amount of header redundancy is equal to the number of bits to the header, and the number of bits of second data redundancy is equal to the number of bits to the second data. The purpose of having second data also convoluted is for the numerology to match, so that, ½ of the number of bits of the first data will be equal to the number of bits of the second data and the header, so that, the ratio of the number of bits in the first data to that in the combined second data and header is equal to 2.

The first data are presented on input bits d1 and d2. The header and second data are presented on bit d3. Therefore, the convoluted bits e3 and e4 providing information content of the header, header redundancy, second data, and second data redundancy. As such, the number of convoluted bits b1, b2, b3, b4 are all equal in number and are modulated into an equal number of symbols of a symbol stream communicating the compressed data and header information content in coded data frame in which is modulated the header and header redundancy, the first data, and the second data and second data redundancy. Because the input data frame is translated so that header and second data are convoluted into bits b3 and b4 as the first data is split onto bits b1 and b2 with the nibbles being modulated into symbols, the symbol stream is transmitted as a coded data frame having translated and redundant information content. That is, the coded data frame has information content that is translated in order and includes header redundancy and header information content designated as a coded header, uncoded first data, second data and second data redundancy information content designated as coded second data, all contained within a transmitted coded data frame of the symbol stream. The information content is not contained within the symbol stream in the order of coded header, uncoded first data, and coded second data. For example, the first symbol of the symbol stream would encode in the receiver as two bits of uncoded first data and two bits of information content indicating initial bits of the header, header redundancy, second data, and second data redundancy.

The coded frame data structure order as shown is only valid when a block code is used in the convolutional encoder. When a convolutional code is used across both the header and second data, all of coded bits resulting from the convolutional process on the data bit d3, comprising header and second data, are intermixed information content that is separated during reception. Therefore, in the preferred form, when a convolutional encoder is used, there is no separate and distinct portions of the header or header redundancy, and second data or second data redundancy, but rather, there is coded information content indicating the header, header redundancy, second data, or second data redundancy. The convolutional encoder with Viterbi decoder combines an exemplar form of unequal coding. Any encoder and decoder pair can be used to replace the convolutional encoder in the transmitter and the Viterbi decoder in the receiver. When a convolution encoder is used, the coded header is header information content and coded second data is second data information content. When block codes are used, there would be separate and distinct header, header redundancy, second data, and second data redundancy segment of the coded data frame.

The transmitted symbols are received by the 16QAM receiver and more particularly received by a MSB quadrant demodulator. The 16QAM receiver includes the MSB quadrant demodulator providing a MSB data output that are nibble bits b1 and b2 that are also the data bits d1 and d2. The MSB quadrant demodulator receives the symbols as a quadrature signal. The MSBs are first determined by the quadrant demodulator relying on interquadrant signal discrimination. That is, channel corrupted first data, which is uncoded, is used as the MSBs for the rapid and modestly reliable QAM quadrant detection of the first data that is presented as a MSB data output of the nibble bits b1 and b2 that are also the data bits d1 and d2. The LSBs signal levels defined by the QAM modulation are communicated to a quantizing soft metric former for presenting LSBs as demodulated data sets or soft metrics. The data sets or soft metrics are coded data fed to a LSB Viterbi decoder that functions to decode the LSB data sets or soft metrics into the LSB data output, that is, the data bit d3. Channel corrupted second data, second data redundancy, header, and header redundancy informational content are contained within the data sets or soft metrics from the quadrant demodulator. The data sets or soft metrics are used as a LSB input to the LSB Viterbi decoder. The Viterbi decoder provides the LSB data output including the header and the second data. The nibble bits b3 and b4 electrical signal values are fed into a soft metric former for providing e3 and e4 soft metrics for the nibble bits b3 and b4. The Viterbi decoder processes the e3 and e4 soft metrics for determining the data bit d3. The MSB data output d1 and d2, and LSB data output d3 can then be retranslated by an output data translator into output data that is the input data subject to a system BER. When the input data and output data are compressed data sets, the input data can be compressed by an input compressor, not shown, and the output data can then be decompressed by a decompressor, also not shown.

In summary, the input data is preferably in the form of an input data frame having a first segment and a second segment of the input data frame. The input data comprises at least two segments, such as a header and compressed data when input compression is preferably used. In the preferred form, the compressed data is portioned into first data and second data for numerology. A translator translates the input data into data bits d1, d2, and d3 where the first data is on data bits d1 and d2, and the header and second data is on data bit d3. The encoder convolutes data on the data bit d3 onto convoluted bits e3 and e4. The data bits d1 and d2 are the MSBs and convoluted bits e3 and e4 are LSBs. The data bits d1 and d2 and the convoluted bits e3 and e4 are grouped into nibbles b1b2b3b4 having bit b1, b2, b3, and b4, for defining symbols. The hierarchical modulator modulates the nibbles, that is, symbols into electrical signals for providing a stream of symbols in a code frame structure having a coded header, first data, and coded second data. The coded header has information content indicating the header and header redundancy and coded second data has information content indicating the second data and second data redundancy. The symbol electrical signals are received by the MSB quadrant demodulator providing nibble bits b1 and b2 that are also the data bits d1 and d2 for providing the first data as the MSB data output. The MSB data output provides estimates of the first data. The quadrant demodulator provides LSB signal levels to a soft metric former providing convoluted bits e3 and e4 as soft metrics. The LSB Viterbi decoder decodes the convoluted bits e3 and e4 soft metrics, that are the nibble bits b3 and b4, into data bit d3 as the LSB data output. The LSB data output provides estimates of the header and second data. The output data translator translates the estimates of the first data, header, and second data as output data that is an estimate of the input data subject to a BER. The output data can then be decompressed into the original input data when the original input data was compressed into the header and compressed data.

Figure 3:
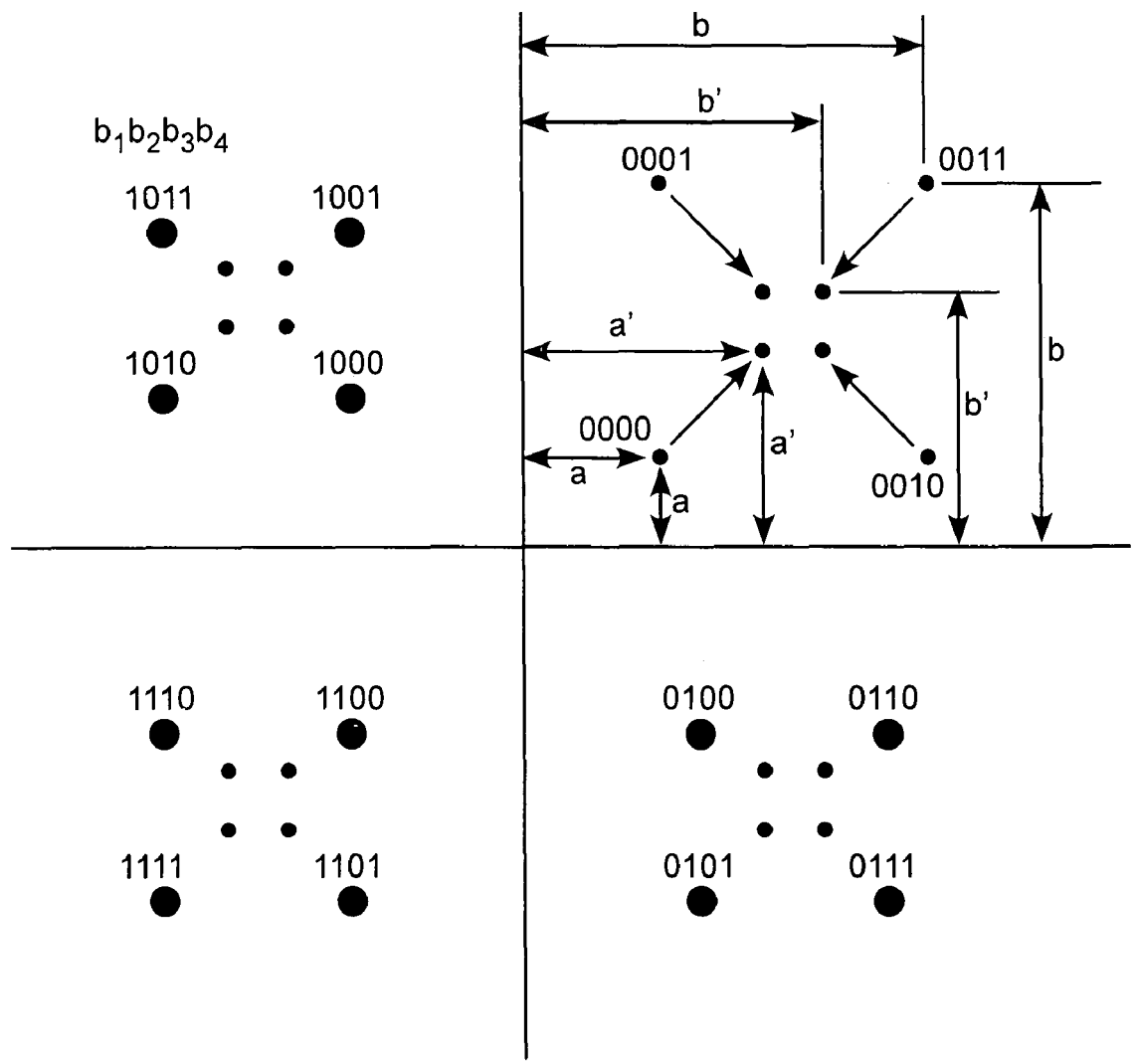
FIG. 3 is hierarchical signal constellation diagram.

Referring to FIGS. 1, 2, and 3, and more particularly to FIG. 3, a nibble of bits b1, b2, b3, and b4 defines sixteen points within a 16QAM hierarchical signal constellation having a vertical axis and horizontal axis used in inphase and quadrature signaling, that is, the modulation is in quadrature. The MSBs b1 and b2 define the four quadrants which can be modestly reliably detected and discriminated by the +/− sign of inphase and quadrature signal levels. There are four quadrants including 00b3b4, 10b3b4; 01b3b4, and 11b3b4 quadrants. Within each of the quadrants, there are four points b1b200, b1b201, b1b210, and b1b211. The LSBs b3 and b4 define four points in the constellation space within each quadrant. The four points within each quadrant are moved closer together by like definition in the hierarchical modulator and the soft metrics former. The movement of the four points is defined by a difference of quadrature signal levels a to a', and b to b'. For the quadrant 00b3b4, for example, the point 0000 is moved from signal levels aa to signal levels a'a', the point 0001 is move from signal levels ab to a'b', the point 0010 is moved from signal levels ba to b'a', and point 0011 is moved from signal level bb to b'b'. When moving by modulation and soft metric definition the points in a constellation quadrant closer together, there is inherently less discrimination between the quadrant points reducing slightly reliable detection, in the first instance.

The nibble bits b1 and b2 are the MSBs for each symbol used by the 16QAM hierarchical modulator. The nibble bits b1 and b2 are also the data bits d1 and d2 for the first data. The nibble bits b1 and b2 provided uncoded data. The nibble bits b3 and b4 are the LSBs of each symbol modulated by the 16QAM hierarchical modulator. The nibble bits b3 and b4 are the convoluted bits e3 and e4. The nibble bits b3 and b4 are coded data for the header and second data. The modulator provides large interquadrant discrimination and small intraquadrant discrimination. As such, the modulation method is a hierarchical modulation where interquadrant points have a higher level of reliable detection and intraquadrant points have a lesser level of reliable detection. The 16QAM hierarchical modulation of the nibble bits b1 and b2 provide modestly improved reliable interquadrant detection. Received signals of b3 and b4 within a quadrant are moved closer together by definition, and hence, b3 and b4 bits have slightly less discrimination and hence slightly degraded detection, and would first seem to have less reliability upon detection. However, because of convolutional coding of data bit d3 providing convoluted bits e3 and e4 as nibble bits b3 and b4, reliability with respects to nibble bits b3 and b4 is ultimately significantly improved by virtue of the convolutional encoding and Viterbi decoding even in the presence of slight LSB detection degradation. Thus, the MSB b1 and b2 have slightly improved reliable detection based upon interquadrant mapping into the constellation space, whereas the LSB b3 and b4 have less reliable discrimination detection based upon intraquadrant mapping, but with the LSBs b3 and b4 reliability being significantly improved due to the convolutional encoding and decoding. In this manner, the LSB data d3 communicating the header and consequently the second data have significantly improved detection whereas the MSB data bits d1 and d22 have modest improved detection. Hence, the difference in reliable detection between the first data as compared to the header and second data with unequal hierarchical modulation and unequal encoding.

Figure 4:
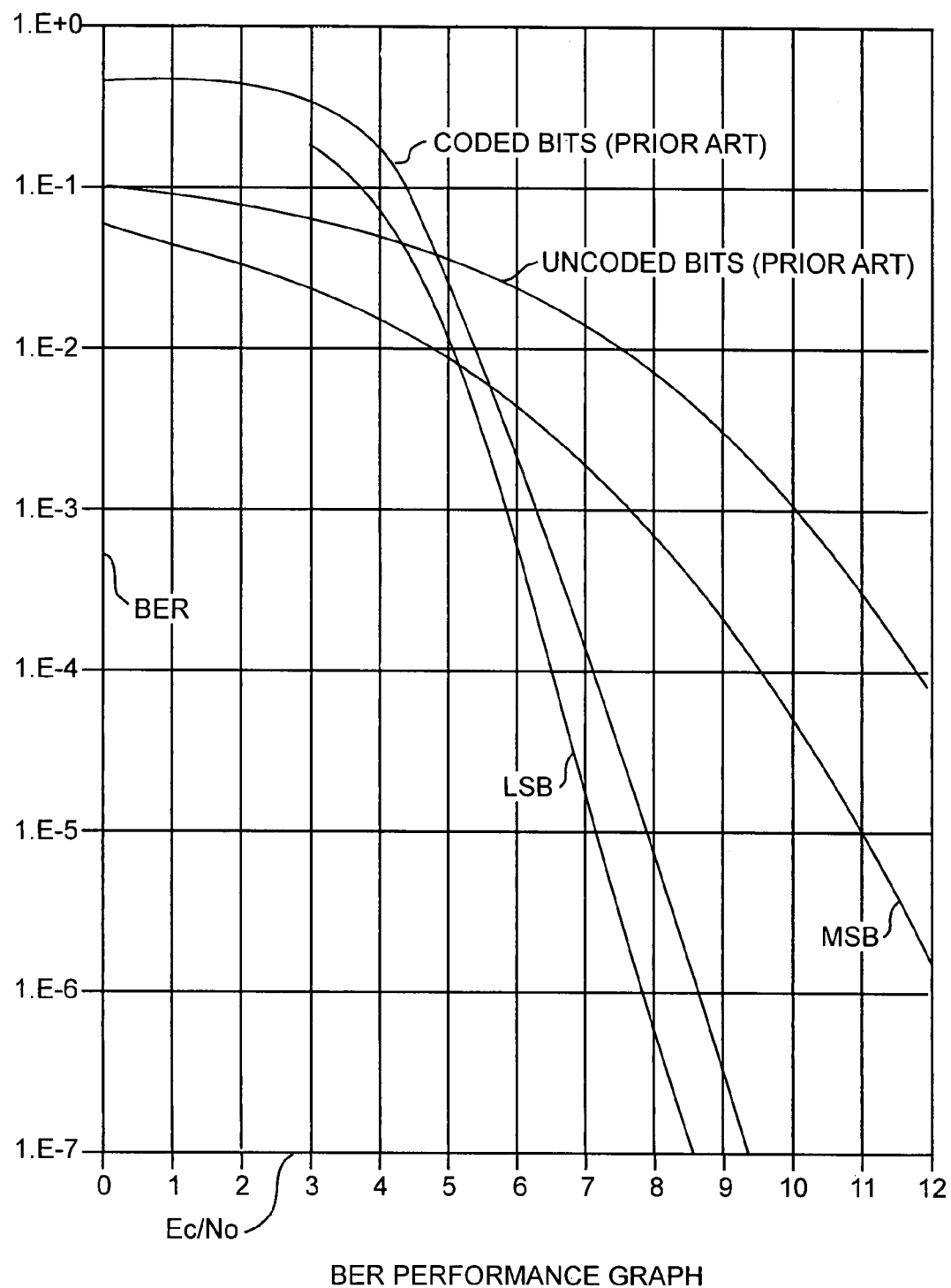
FIG. 4 is a BER performance graph.

Referring to all of the Figures, and more particularly to FIG. 4, the BER performance of the MSBs is compared to conventional uncoded bits and the BER performance of the LSBs is compared to conventional coded bits. Both MSBs and the LSBs detections have improved BERs. A 16QAM symbol signal may be a Grey signal that is used for a hierarchical modulation to effectively transmit three data bits per channel symbol and to provide unequal protection between the data bits. By doing this, the bandwidth efficiency will remain the same as that of 8-ary phase shift keying (8PSK) modulation, for example. For every three bits d1, d2, and d3, the first two bits d1 and d2 are mapped to the MSBs b1 and b2 of the 16QAM Grey constellation. The data bit d3 is encoded using the rate ½ convolutional code. The encoded bits e3 and e4 are then mapped to the bits LSBs b3 and b4 of the 16QAM Grey constellation. If the header bits, which require high protection, are placed at the LSB positions, their robustness can be significantly enhanced by several orders of magnitude due to convolutional code. The preferred form is the simplest way of designing a receiver is to first determine which quadrant the received signal in mapped. Given the quadrant being determined, the distances from the received signal to the four possible signals within that quadrant are used to form the e3 and e4 soft metrics for Viterbi decoding for determining the LSB d3.

The MSB of hierarchical modulation can be both analytically derived and simulated. If the conventional 16QAM Grey constellation is used, the MSB of hierarchical modulation outperforms conventional 16QAM and slightly inferior to 8PSK modulation. The coded performance of LSBs of the hierarchical modulation can be simulated. The BER performance of the ordinary convolutionally coded 16QAM without using the hierarchical modulation can also be simulated. There is a degradation of about 1.5 dB for the LSBs of the hierarchical modulation in comparison with the ordinary coded 16QAM. This degradation is mainly due to the non-reversible errors made by the detection of MSB when a quadrant is determined. The required $E_c/N_O$ gain for a BER for the LSB of $10^{-6}$ is 6.0 dB. At such an operating point, BER of the MSB is worse that 2%, not meeting its requirement of $10^{-3}$ or $10^{-4}$. Hence, in order to satisfy the system requirements, the operating point must be at 10.0 dB or 12.0 dB depending on the required BER of the MSB being $10^{-3}$ or $10^{-4}$, respectively. This operating point does not reflect a significant advantage of using hierarchical modulation. However, system efficiency can be improved when the four constellation points in the same quadrant are moved by definition inward so that the four quadrant points are closer to each other. Although the reduction of distances among these four constellation quadrant points results in degraded BER performance on the LSB for improved detection of the MSB, ultimate detection of the data bit d3 is significantly improved on the LSB due to the use of coding. The purpose of the constellation change is to increase the minimum Euclidean distance among four quadrant clusters, each of which consists of four points in the same quadrant. By increasing the quadrant distance, the BER on MSB will be improved while the BER on the LSB is degraded.

The new signal levels a' and b' are respectively the shortest and the longest distances to the inphase or quadrature axis from any cluster of four quadrant points. The average power over the 16 constellation points must remain unity for $a'=k \cdot a$ and $b'=\sqrt{10-k^2} \cdot a$ where $a^2=E_S/10$ and k is the reduction ratio and $E_S$ is the signal symbol power. The BER can be calculated from $a^2$, $E_S$, and $N_O$ where $N_O$ is Gaussian noise injected over the channel at operating points $E_C/N_O$, where $E_C$ is the uncoded or coded bit energy. The BER of a hierarchical structure with $k^2=1.7$ is shown in FIG. 4. With this hierarchical structure of $k^2=1.7$, the BER for the MSB at $10^{-3}$ and BER for the LSB at $10^{-6}$ can be simultaneously achieved at an operating point of $E_C/N_O=8.0$ dB. When the required BER for the MSB is $10^{-4}$, the operating point can be set at $E_C/N_O=9.0$ dB with $k^2=2.0$ at which BER of $10^{-6}$ for the LSB can be simultaneously achieved.

When 8PSK is used in lieu of 16QAM hierarchical modulation, all bits will be subject to the same BER. In this case, a BER requirement of $10^{-6}$ is imposed, and hence the required $E_C/N_0$ equals 14.0 dB accordingly. This is significantly worse than when using 16QAM hierarchical modulation. However, when comparing 16QAM hierarchical modulation with 8PSK, the peak-to-average power ratio inherent to the 16QAM waveform should be taken into account. This is due to the fact that a power back-off is required when a 16-QAM signal, with a non-constant envelope when the peak-to-average power ratio is greater than one, is emitted using a conventional high power amplifier. The back-off is needed to avoid signal distortion near the saturation region of a nonlinear device, such as a high power amplifier. The 8PSK signal, with a constant envelope for peak-to-average power ratio equal to 1, does not require a power back-off. Hence, 8PSK inherently holds a power advantage from practical implementation points of view. The peak-to-average power ratio of the 16QAM hierarchical modulation decreases as k increases. For example, when $k^2=1.7$, peak-to-average power ratio is 2.2 dB, reduced from 2.55 dB given by the ordinary Grey 16QAM. When $k^2=2.0$, peak-to-average power ratio is further decreased to 2.04 dB. For a given $E_S$, the 16QAM hierarchical modulation bit has 1.24 dB=$10.\log_{10}(4/3)$ less energy than the 8PSK modulation bit. Therefore, the actual advantage of 16QAM hierarchical modulation over 8PSK is 1.24 dB less. Taking all into account, the 16QAM hierarchical modulation still outperforms the ordinary 8PSK modulation, both have the same bandwidth efficiency, by more than 1 dB. The superiority of 16QAM hierarchical modulation over 8PSK is due to the adoption of unequal forward error correcting code and unequal hierarchical modulation.

The present invention is directed to providing unequal encoding and unequal modulation of different segments of input data. In the preferred form, a ½ rate convolutional encoder and an unequal 16-QAM modulator is used. The encoder unequally encodes one data segment into coded data while another data segment is uncoded as uncoded data. The coded data and uncoded data are modulated by a modulator that unequally modulates the coded and uncoded data within a constellation space. In the preferred form, uncoded is modulated by quadrants and coded data is modulated by points within a quadrant. The points within a quadrant have equal spacing, which is unequal to the spacing between points from different quadrants. Different types of unequal encoding and unequal modulation can be used to provide unequal BER performance across an input data frame. The preferred form provides that first data is uncoded and the second data and header are coded. The first data, that is, the first segment, could be coded as well with a relative level of coding, so long as the coding for the first segment and second segment is different for unequal protection, within the spirit and scope of the invention. Those skilled in the art can make enhancements, improvements, and modifications to the invention, and these enhancements, improvements, and modifications may nonetheless fall within the spirit and scope of the following claims.

What is claimed is:

1. A system for communicating an input data frame having a first segment and a second segment of input data, the system providing unequal coding and unequal modulation, the system comprising, an encoder for receiving the second segment and coding the second segment into coded data, the encoder unequally coding the input data frame for providing unequal coding, and a modulator for receiving the first segment as uncoded data and for receiving the coded data, the modulator modulating the uncoded data and coded data into electrical signals indicating symbols within a constellation space having predetermined respective points, point spacing between the points within the constellation space is unequal providing unequal modulation, wherein the first segment is on two data bits d1 and d2, the second segment is on one data bit d3 and coded data on bits e3 and e4, and wherein bits d1, d2, e3, and e4 are nibble bits b1, b2, b3, and b4 modulated by the modulator, wherein most significant bits (MSB) b1 and b2 define interquadrant spacing and least significant bits (LSB) b3 and b4 define intraquadrant spacing, the interquadrant and intraquadrant spacing being unequal.

2. The system of claim 1 wherein, the unequal coding and unequal modulation providing unequal reliability of communication between the first segment and the second segment.

3. The system of claim 1 wherein, the input data comprises a header and compressed data, the first segment comprises a first portion of the compressed data, and the second segment comprises the header and a second portion of the compressed data.

4. The system of claim 1 wherein,
the input data comprises a header and compressed data,
the first segment comprises a first data portion of the compressed data as first data,
the uncoded data comprises the first data,
the second segment comprises the header, and
the coded data comprises the header and header redundancy.

5. The system of claim 1 wherein,
the input data comprises a header and compressed data,
the first segment comprises a first portion of the compressed data as first data,
the uncoded data comprises the first data,
the second segment comprises the header and a second portion of the compressed data as second data, and
the coded data comprises the header, header redundancy, second data, and second data redundancy.

6. The system of claim 1 wherein,
the encoder is a rate ½ convolution code encoder, and
the modulator is a 16QAM hierarchical modulator having unequal interquadrant and intraquadrant spacing.

7. The system of claim 6 wherein
the modulator is modulating nibble bits into the symbols.

8. The system of claim 1 further comprising,
a demodulator for demodulating the electrical signals of the symbols for providing the first segment as a first output and for providing the first segment,
a decoder for decoding the second segment as a second output, the first output and the second output are combined as output data being the input data.

9. The system of claim 1 further comprising,
a quadrant demodulator for demodulating the electrical signals of the symbols into MSB uncoded data, the MSB uncoded data for providing the first segment as a MSB output, the quadrant demodulator for demodulating the electrical signals of the symbols into LSB coded data,
a decoder for decoding the LSB coded data into the second segment as a LSB output, the LSB output and the MSB output are combined as estimated output data of the input data.

10. The system of claim 1 further comprising,
a quadrant demodulator for demodulating the electrical signals of the symbols into MSB uncoded data, the MSB uncoded data for providing the first segment as a MSB output, the quadrant demodulator for demodulating the electrical signals of the symbols into LSB soft metrics, the soft metrics indicating the coded data for the second segment,
a Viterbi decoder for decoding the LSB soft metrics into the second segment as a LSB output, the LSB output and the MSB output are combined as estimated output data of the input data.

11. The system of claim 1 wherein,
the input data comprises a header and compressed data, the input data being a compression of original data,
the first segment comprises a first portion of the compressed data, and
the second segment comprises the header and a second portion of the compressed data,
the system further comprising,
an input translator for translating the input data into the first segment and the second segment,
a demodulator for demodulating the electrical signals of the symbols for providing the first segment as a first output and for providing the first segment,
a decoder for decoding the second segment as a second output, and
an output translator for translating the first output and the second output as output data being an estimate of the input data, the output data being an estimate of the compression of the original data.

12. The system of claim 1, further comprising:
a demodulator for demodulating the MSB b1 and b2 to determine a plurality of quadrants in accordance with the interquadrant spacing; and
a decoder that decodes the LSB b3 and b4 into points corresponding to bits e3 and e4 in one of the plurality of quadrants in accordance with the intraquadrant spacing, wherein bits e3 and e4 are utilized by the decoder to obtain the second segment.

13. The system of claim 12, wherein the second segment further includes header data.

14. A system for communicating an input data frame having a first segment and a second segment of input data, the system providing unequal coding and unequal modulation, the system comprising,
an encoder for receiving a second segment and coding the second segment into coded data, the encoder unequally coding the input data frame for providing unequal coding,
a modulator for receiving, bits d1, d2, e3, and e4 as nibble bits b1, b2, b3, b4, the first segment being on bits d1, d2, the second segment on bit d3 and coded as coded data on bits e3 and e4, the modulator modulating the nibble bits into electrical signals indicating symbols within a constellation space having predetermined respective points, point spacing between the points within the constellation space is unequal providing unequal modulation, wherein most significant bits (MSB) b1 and b2 define interquadrant spacing and least significant bits (LSB) b3 and b4 define intraquadrant spacing, the interquadrant and intraquadrant spacing being unequal,
a demodulator for demodulating the electrical signals of the symbols for providing the first segment as a first output and for providing the first segment, p1 a decoder for decoding the second segment as a second output, the first output and the second output are combined as estimated output data of the input data.

15. The system of claim 14 wherein,
the encoder and modulator are disposed in a transmitter,
the demodulator and decoder are disposed in a receiver, and
the input data frame is communicated over a Gaussian channel.

16. The system of claim 14 wherein,
the input data comprises a header and compressed data,
the first segment comprises a first portion of the compressed data as first data, and
the uncoded data comprises the first data,
the second segment comprises the header and a second portion of the compressed data as second data, and
the coded data comprises the header, header redundancy, second data, and second data redundancy.

17. The system of claim 14 wherein,
a demodulator is a quadrant demodulator for demodulating the electrical signals of the symbols into MSB uncoded data, the MSB uncoded data for providing the first segment as a MSB output, the quadrant demodulator for demodulating the electrical signals of the symbols into LSB coded data, and
a decoder for decoding the LSB coded data into the second segment as a LSB output, the LSB output and the MSB output are combined as estimated output data of the input data.

18. A method for communicating an input data frame having a first segment and a second segment of input data, comprising:

receiving, by a receiver, symbols of a constellation space having predetermined respective points, wherein point spacing between the points within the constellation space is unequal, wherein the symbols are generated based upon a modulator receiving bits d1, d2, e3, and e4 as nibble bits b1, b2, b3, b4, the first segment being on bits d1, d2, the second segment on bit d3 and coded as coded data on bits e3 and e4, the modulator modulating the nibble bits into the symbols, wherein most significant bits (MSB) b1 and b2 define interquadrant spacing and least significant bits (LSB) b3 and b4 define intraquadrant spacing, the interquadrant and intraquadrant spacing being unequal;

demodulating, by a demodulator, the symbols to obtain MSB uncoded data and LSB soft metrics;

obtaining the first segment from the MSB uncoded data to provide a first output; and decoding, by a decoder, the LSB soft metrics to obtain the second segment as a second output, wherein the first output and the second output are combined as estimated output data of the input data.

19. The method of claim 18 wherein, the demodulator and the decoder are disposed in the receiver.

20. The method of claim 18 wherein, the input data comprises a header and compressed data, the first segment comprises a first portion of the compressed data, the second segment comprises a second portion of the compressed data and the header.

* * * * *